(12) United States Patent
Cho et al.

(10) Patent No.: US 12,038,055 B2
(45) Date of Patent: Jul. 16, 2024

(54) DISK BRAKE APPARATUS

(71) Applicant: HYUNDAI MOBIS CO., LTD., Seoul (KR)

(72) Inventors: Yeong Bin Cho, Yongin-si (KR); Min Hyung Cho, Yongin-si (KR); Seong Hwan Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 167 days.

(21) Appl. No.: 17/507,562

(22) Filed: Oct. 21, 2021

(65) Prior Publication Data
US 2022/0128107 A1    Apr. 28, 2022

(30) Foreign Application Priority Data
Oct. 22, 2020   (KR) ........................ 10-2020-0137775

(51) Int. Cl.
*F16D 65/38* (2006.01)
*F16D 55/226* (2006.01)
*F16D 65/00* (2006.01)
*F16D 65/095* (2006.01)
*F16D 65/18* (2006.01)
*F16D 121/04* (2012.01)

(52) U.S. Cl.
CPC ....... *F16D 65/0006* (2013.01); *F16D 55/226* (2013.01); *F16D 65/095* (2013.01); *F16D 65/18* (2013.01); *F16D 2121/04* (2013.01)

(58) Field of Classification Search
CPC .. F16D 65/0006; F16D 55/226; F16D 65/095; F16D 65/0971; F16D 65/18; F16D 2121/04
See application file for complete search history.

(56) References Cited

U.S. PATENT DOCUMENTS 4,155,430 A * 5/1979 Kawamura ......... F16D 65/0971
                                                  188/73.37
6,193,024 B1 * 2/2001 Heppes ................ F16D 65/092
                                                  188/73.1
(Continued)

FOREIGN PATENT DOCUMENTS

EP         1099871 A2 *  5/2001  ........... F16D 65/092
KR    1020080010852 A    1/2008

OTHER PUBLICATIONS

Machine translation of EP 1099871 (No. date).*

*Primary Examiner* — Nicholas J Lane
(74) *Attorney, Agent, or Firm* — NovoTechIP International PLLC (57) ABSTRACT

A disk brake apparatus may include a caliper body installed on the outer circumference of a disk; a piston member installed in the caliper body, and moved by hydraulic pressure; a brake pad pressed toward the disk by the piston member; and a shim plate installed between the piston member and the brake pad, formed in a plate shape, and abutting on a piston contact part installed on a surface of the piston member, facing the brake pad, the shim plate may include a cover shim brought into contact with the piston contact part; and a pad shim stacked on a surface of the cover shim, facing the brake pad, and including an opening formed through a region which overlaps at least a part of the piston contact part.

7 Claims, 7 Drawing Sheets

(56) References Cited

U.S. PATENT DOCUMENTS

| | | | | |
|---|---|---|---|---|
| 7,370,736 B2* | 5/2008 | Anda | ................ | F16D 65/0971 188/73.36 |
| 2004/0035651 A1* | 2/2004 | Renauld | ................ | F16D 55/22 188/73.37 |
| 2013/0025982 A1* | 1/2013 | Suzuki | ............... | F16D 65/0979 188/72.4 |
| 2016/0146276 A1* | 5/2016 | Kobayashi | ......... | F16D 65/0971 188/250 F |

* cited by examiner

DISK BRAKE APPARATUS

CROSS-REFERENCE TO RELATED APPLICATIONS

This application claims the benefit under 35 U.S.C. § 119(a) of Korean Patent Application No. 10-2020-0137775, filed on Oct. 22, 2020, in the Korean Intellectual Property Office, the entire disclosure of which is incorporated herein by reference for all purposes.

BACKGROUND OF THE INVENTION

1. Field of the Invention

Exemplary embodiments of the present disclosure relate to a disk brake apparatus, and more particularly, to a disk brake apparatus which reduces a required amount of fluid while uniformizing the surface pressure of a brake pad during braking.

2. Discussion of Related Art

In general, a disk brake apparatus of a vehicle refers to a brake apparatus that generates a braking force by pressing a brake pad against either side of a disk-shaped brake disk rotated with a wheel.

The disk brake apparatus of the vehicle includes a caliper body installed at the outer circumference of the brake disk rotated with the wheel, a brake pad inserted into the caliper body and installed on either side of the brake disk, and a piston configured to press the brake pad toward the brake disk. When a driver of the vehicle performs a brake operation, the piston is moved by braking hydraulic pressure, and the brake pad is pressed against the disk by the piston which is advanced or retreated, thereby generating a friction force. At this time, as the rotation of the disk is stopped by the generated friction force, the vehicle in operation may be braked.

However, a load (surface pressure) applied to the disk from the brake pad during the brake operation is larger at the leading side of the disk in the rotation direction thereof than at the trailing side thereof. Such an imbalance in surface pressure between the brake pad and the disk generates noise.

In order to solve such a problem, the conventional disk brake apparatus has an opening formed in a shim plate provided between the brake pad and the piston, such that the surface pressure is uniformized.

In the related art, however, the opening formed in the shim plate which comes into contact with the piston may disturb the behavior of the piston when hydraulic pressure is generated. In this case, the required amount of fluid for braking may be increased. Such an increase is directly connected to a brake pedal stroke of a vehicle. More specifically, when the required amount of fluid is increased, the pedal stroke is increased to make a driver feel a pedal push during braking. Thus, the stroke performance of the actual vehicle is degraded.

Therefore, there is a need for a technology capable of minimizing the increase in the required amount of fluid for the piston, while uniformizing the surface pressure between the brake pad and the disk in the disk brake apparatus.

The related art of the present disclosure is disclosed in Korean Patent Application Publication No. 2008-0010852 published on Jan. 31, 2008 and entitled "Disk Brake for Vehicle".

BRIEF SUMMARY OF THE INVENTION

Various embodiments are directed to a disk brake apparatus which includes an opening formed in a pad shim, not a cover shim which comes into contact with a piston member, and thus minimizes the increase in required amount of fluid in the piston member while uniformizing the surface pressure between a brake pad and a disk.

Also, various embodiments are directed to a disk brake apparatus which improves the performance of a vehicle while minimizing the generation of noise during braking.

In an embodiment, a disk brake apparatus may include: a caliper body installed on an outer circumference of a disk; a piston member installed in the caliper body, and moved by hydraulic pressure; a brake pad pressed toward the disk by the piston member; and a shim plate installed between the piston member and the brake pad, formed in a plate shape, and abutting on a piston contact part installed on a surface of the piston member, facing the brake pad. The shim plate may include: a cover shim brought into contact with the piston contact part; and a pad shim stacked on a surface of the cover shim, facing the brake pad, and including an opening formed through a region which overlaps at least a part of the piston contact part.

The cover shim may have a larger size than the piston contact part.

The cover shim may have no opening formed therein.

When a rotation entrance of the brake pad in a rotation direction of the disk is referred to as a leading side and a rotation exit of the brake pad in the rotation direction of the disk is referred to as a trailing side, the opening may be located at the leading side around a center of the pad shim.

The piston contact part may be formed in a ring shape, and the opening may be formed in an arc shape around a center of the piston contact part, and have a larger outer diameter than the piston contact part.

The opening may have an inner diameter which is larger than an inner diameter of the piston contact part and smaller than an outer diameter of the piston contact part.

When a center of surface pressure between the disk and the brake pad by the piston member in case that the opening is not formed in the pad shim is referred to as a first surface pressure center, and a center of surface pressure between the disk and the brake pad moved by the opening is referred to as a second surface pressure center, a center movement distance indicating a distance between the first surface pressure center and the second surface pressure center may be decided in consideration of a coefficient of friction between the brake pad and the disk.

The inner diameter of the opening may be decided on the basis of the center movement distance.

In the shim plate in accordance with the embodiment of the present disclosure, the opening may be formed in the pad shim, not the cover shim which comes into contact with the piston member, which makes it possible to minimize the increase in required amount of fluid in the piston member, while uniformizing the surface pressure between the brake pad and the disk.

In accordance with the embodiment of the present disclosure, it is possible to improve the performance of the vehicle while minimizing the generation of noise during braking.

Furthermore, the center movement distance may be decided in consideration of a change in coefficient of friction between the brake pad and the disk, and the inner diameter of the opening may be decided through the center movement distance, which makes it possible to decide the inner diameter of the opening to uniformize the surface pressure distribution.

DETAILED DESCRIPTION OF THE INVENTION

Hereafter, embodiments of the present disclosure will be described in detail with reference to the accompanying drawings.

First, the following embodiments are embodiments suitable for promoting understandings of the technical features of a disk brake apparatus for a vehicle in accordance with the present disclosure. However, the present disclosure is not limited to the following embodiments, the technical features of the present disclosure are not limited by the following embodiments, and the present disclosure can be modified in various manners without departing from the scope of the present disclosure.

Figure 1:
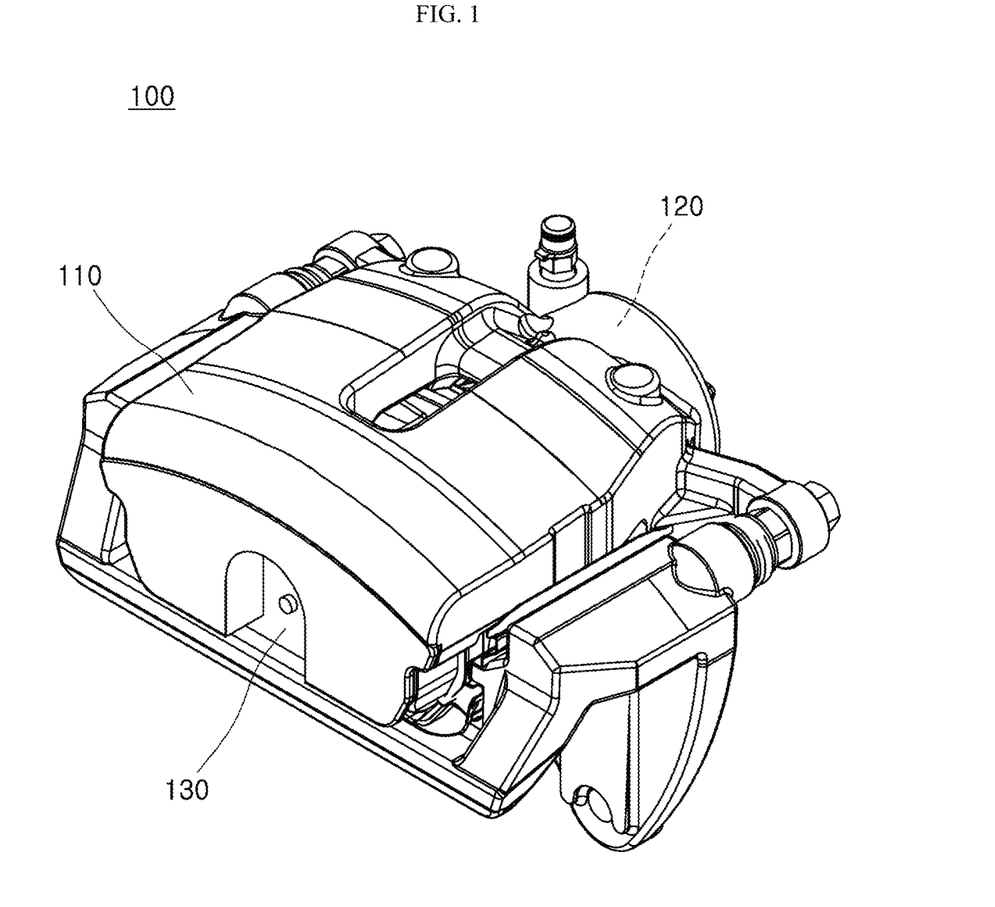
FIG. 1 is a perspective view illustrating a disk brake apparatus in accordance with an embodiment of the present disclosure.
Figure 2:
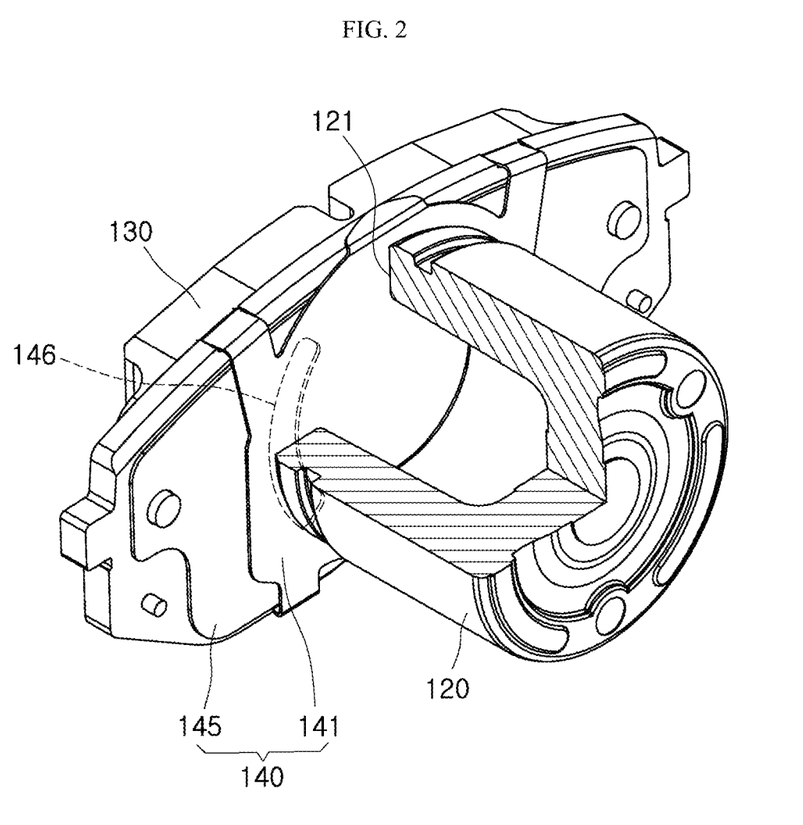
FIG. 2 is a perspective view illustrating the disk brake apparatus in accordance with the embodiment of the present disclosure, from which a caliper body of FIG. 1 is removed.
Figure 3:
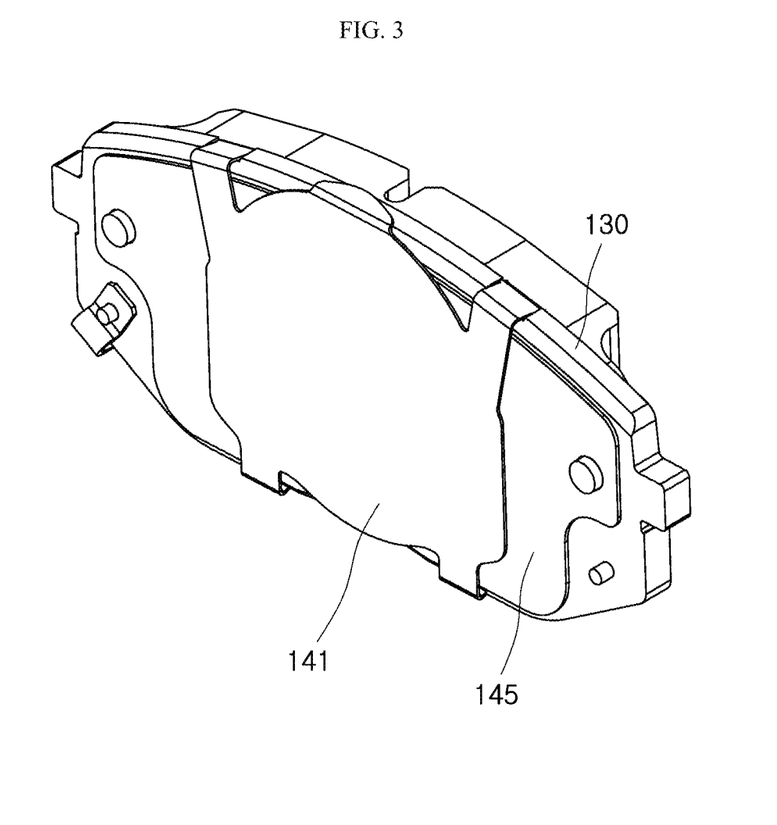
FIG. 3 is a perspective view illustrating that a brake pad and a shim plate are coupled to each other in the disk brake apparatus in accordance with the embodiment of the present disclosure.
Figure 4:
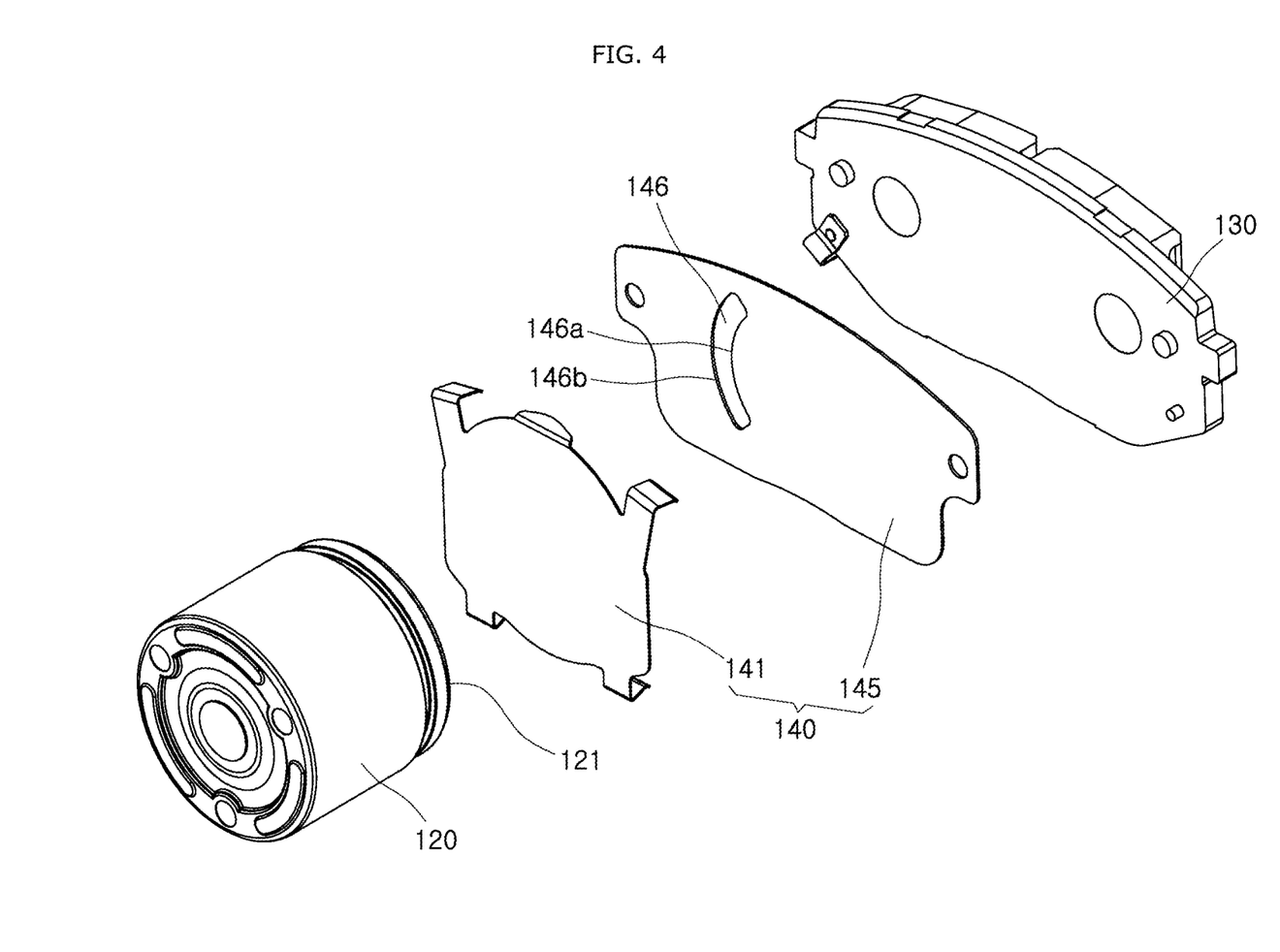
FIG. 4 is an exploded perspective view of the disk brake apparatus in accordance with the embodiment of the present disclosure.

FIG. 1 is a perspective view illustrating a disk brake apparatus in accordance with an embodiment of the present disclosure, FIG. 2 is a perspective view illustrating the disk brake apparatus in accordance with the embodiment of the present disclosure, from which a caliper body of FIG. 1 is removed, FIG. 3 is a perspective view illustrating that a brake pad and a shim plate are coupled to each other in the disk brake apparatus in accordance with the embodiment of the present disclosure, and FIG. 4 is an exploded perspective view of the disk brake apparatus in accordance with the embodiment of the present disclosure.

Figure 5:
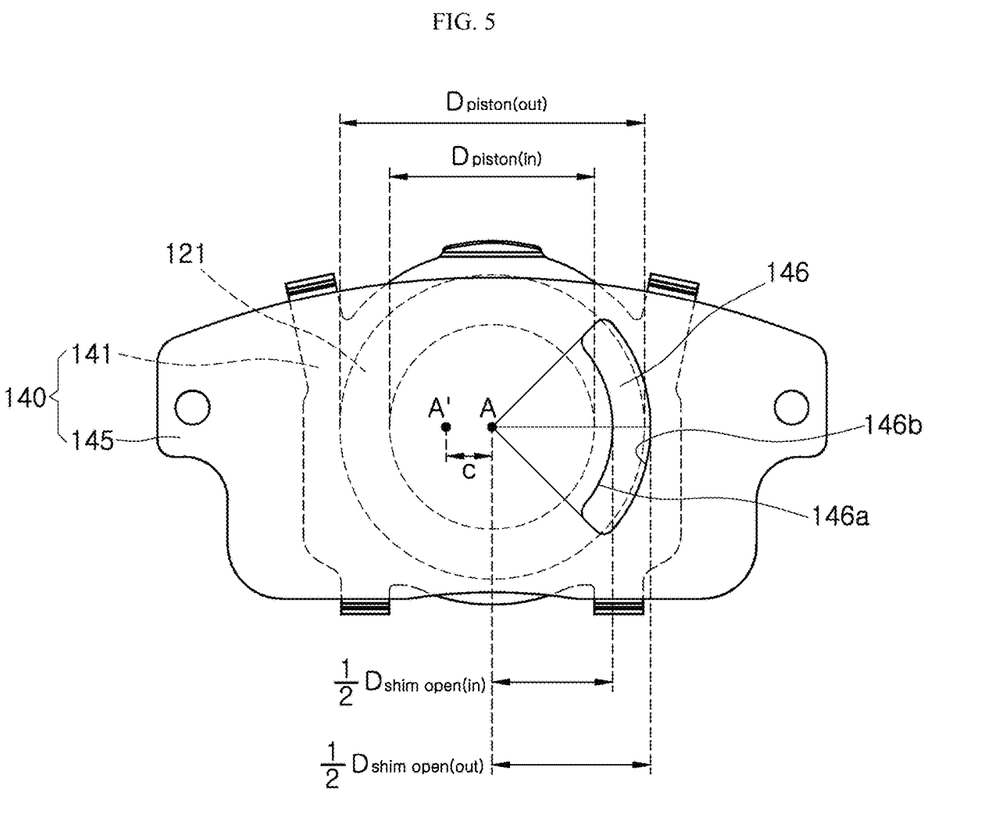
FIG. 5 is a front view illustrating that the brake pad and the shim plate are coupled to each other in the disk brake apparatus in accordance with the embodiment of the present disclosure, when seen from a pad shim.
Figure 6:
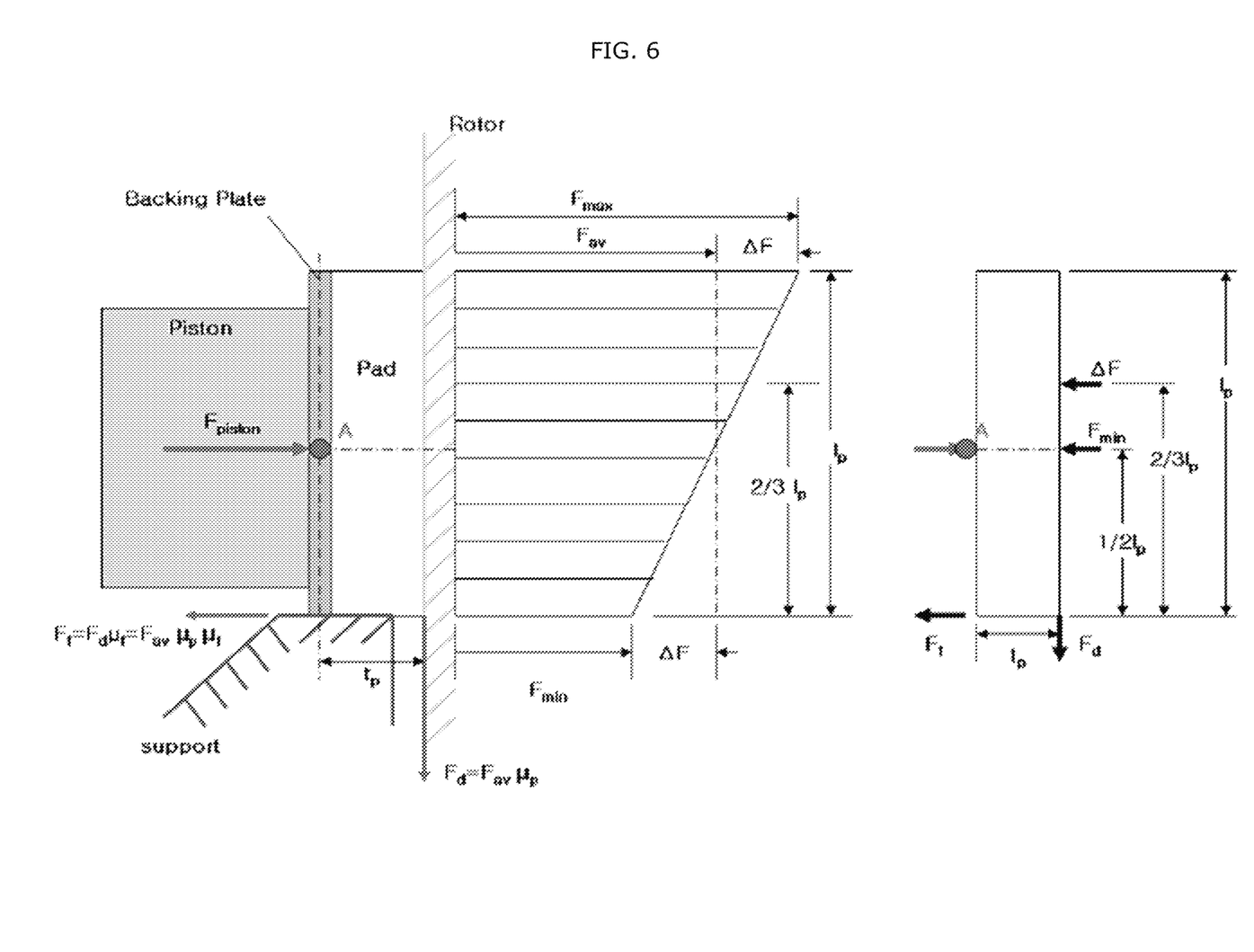
FIG. 6 is a diagram for describing a pressure gradient between the brake pad and the shim plate when the pad shim has no opening formed therein.
Figure 7:
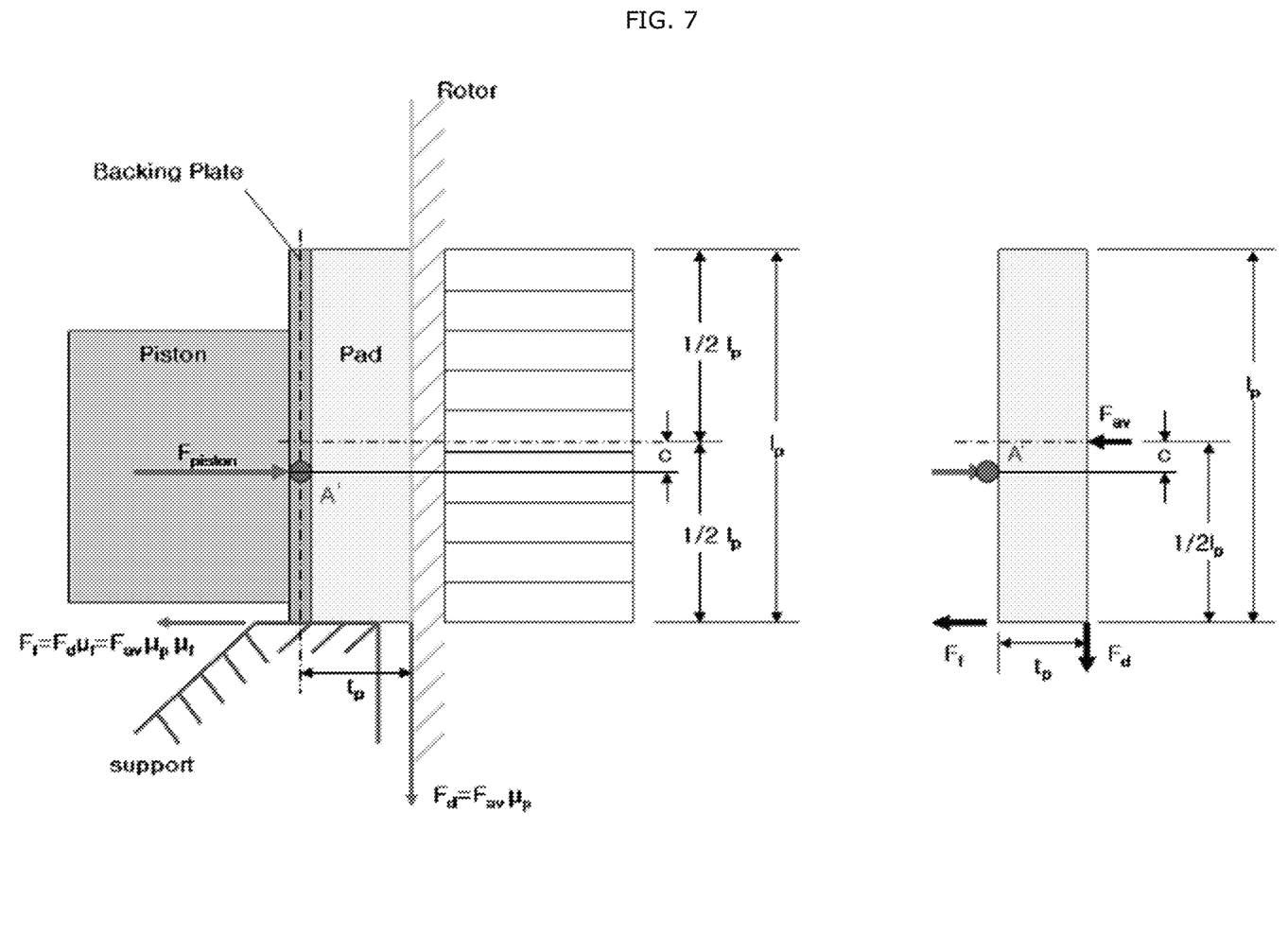
FIG. 7 is a diagram for describing a pressure gradient between the brake pad and the shim plate when the pad shim has an opening formed therein.

FIG. 5 is a front view illustrating that the brake pad and the shim plate are coupled to each other in the disk brake apparatus in accordance with the embodiment of the present disclosure, when seen from a pad shim, FIG. 6 is a diagram for describing a pressure gradient between the brake pad and the shim plate when the pad shim has no opening formed therein, and FIG. 7 is a diagram for describing a pressure gradient between the brake pad and the shim plate when the pad shim has an opening formed therein.

Referring to FIGS. 1 to 5, a disk brake apparatus 100 in accordance with an embodiment of the present disclosure includes a caliper body 110, a piston member 120, a brake pad 130 and a shim plate 140.

The caliper body 110 is installed or positioned on the outer circumference of a rotating disk (not illustrated).

Specifically, the disk may be rotated with a wheel when the wheel is rotated, and formed in a disk shape, and the caliper body 110 may be installed on a part of the outer circumference of the disk.

The piston member 120 is installed in the caliper body 110 so as to be moved by hydraulic pressure.

Specifically, the piston member 120 may be formed in a cylindrical shape, and installed in the caliper body 110 so as to be moved in the axial direction of the disk. That is, the piston member 120 may be advanced or retreated in the axial direction of the disk by hydraulic pressure. For example, during a brake operation of a driver in the vehicle, the piston member 120 may be moved toward the disk by fluid pressure supplied from the outside.

The brake pad 130 is pressed toward the disk by the piston member 120.

When the piston member 120 is moved by the brake operation of the driver in the vehicle, the moved piston member 120 presses the brake pad 130 toward the disk. At this time, as a braking force is applied to the disk by the friction force acting between the brake pad 130 and the disk, a braking process is performed.

The shim plate 140 is installed between the piston member 120 and the brake pad 130, formed in a plate shape, and provided to abut on a piston contact part 121 installed on a surface of the piston member 120, facing the brake pad 130.

The shim plate 140 may be coupled to a surface of the brake pad 130, facing the piston member 120, and serve to reduce noise generated during braking.

The shim plate 140 includes a cover shim 141 and a pad shim 145. The shim plate 140 may be coupled to the brake pad 130, with the plate-shaped cover shim 141 and the plated-shaped pad shim 145 stacked therein.

The cover shim 141 comes into contact with the piston contact part 121. The piston member 120 may be formed in a cylindrical shape, and the piston contact part 121 which comes in contact with the cover shim 141 may be formed in a ring shape. Therefore, the contact region of the cover shim 141 with the piston contact part 121 may be formed in a ring shape corresponding to the piston contact part 121.

The cover shim 141 may have a larger size than the piston contact part 121. That is, the outer circumference of the cover shim 141 may be larger than the outer diameter of the piston contact part 121. Thus, when pressure is applied by the piston member 120, the piston member 120 may not be separated.

The pad shim 145 is stacked on a surface of the cover shim 141, facing the brake pad 130, and includes an opening 146 formed through an area which overlaps at least a part of the piston contact part 121. That is, at least a part of the opening 146 may overlap the contact region of the cover shim 141.

The opening 146 of the shim plate 140 in accordance with the embodiment of the present disclosure may be formed in the pad shim 145, not the cover shim 141 in contact with the piston member 120, which makes it possible to minimize the increase in required amount of fluid in the piston member 120, while uniformizing the surface pressure between the brake pad 130 and the disk.

In the related art, the opening is formed in the cover shim 141 which comes into contact with the piston member 120, such that the surface pressure between the brake pad 130 and the piston member 120 is uniformized to minimize the instability of squeal noise. However, when the opening is formed in the cover shim 141, the surface pressure may be uniformized, but the torsional behavior of the piston member 120 may be degraded by the opening. In this case, the required amount of fluid for braking may be increased. When the required amount of fluid in the piston member 120 is increased, a pedal stroke may be increased to make the driver feel a pedal push during braking. Thus, the stroke performance of the actual vehicle may be degraded.

In order to solve such a problem, the opening 146 may be formed in the pad shim 145, not the cover shim 141 which comes into direct contact with the piston member 120. Thus, the required amount of fluid may be reduced to improve the performance of the actual vehicle, and simultaneously, the surface pressure between the brake pad 130 and the disk may be uniformized to minimize the generation of noise.

When the rotation entrance of the brake pad 130 in a rotation direction B of the disk is referred to as a leading side 130a and the rotation exit of the brake pad 130 is referred to as a trailing side 130b, the opening 146 may be located toward the leading side 130a of the brake pad 130 around the center of the pad shim 145. Thus, as the center of the surface pressure between the brake pad 130 and the disk is moved, the surface pressure may be uniformized.

When the shim plate 140 has no opening 146, torque may be generated depending on the rotation direction B of the disk, such that the pressure at the leading side 130a becomes larger than the pressure at the trailing side 130b. In this case, uneven wear of the brake pad at the leading side 130a may be increased, and the difference in wear between the leading side 130a and the trailing side 130b may increase the exciting force of the brake pad 130.

Therefore, in order to move the center of the pressure toward the trailing side 130b, the opening 146 may be located at the leading side 130a. That is, since a load may be reduced at the portion where the opening 146 is formed, the opening 146 may be formed adjacent to the leading side 130a where relatively large surface pressure occurs.

The piston contact part 121 may be formed in a ring shape. Furthermore, the opening 146 may be formed in an arc shape around the center of the piston contact part 121, and have a larger outer diameter than the piston contact part 121.

Specifically, the opening 146 may be provided as an arc-shaped long hole, and an inner portion 146a and an outer portion 146b of the opening 146 may be formed in an arc shape around the center of the piston contact part 121. When the distance from the center of the piston contact part 121 to the inner portion 146a of the opening 146 is referred to as the inner diameter of the opening 146 and the distance from the center of the piston contact part 121 to the outer portion 146b of the opening 146 is referred to as the outer diameter of the opening 146, the outer diameter of the opening 146 may be larger than the outer diameter of the piston contact part 121. That is, the outer portion 146b of the opening 146 may be located outside the piston contact part 121.

When the outer diameter of the piston contact part 121 is larger than the outer diameter of the opening 146, the outside of the opening 146 may be pressed by the piston contact part 121. In this case, non-uniform pressure may occur. In this case, since it may be difficult to secure a uniform surface pressure pattern through the movement of the center of the surface pressure, the exciting force to cause noise may be increased.

Therefore, in the present embodiment, the opening 146 may be formed to have a larger outer diameter than the piston contact part 121, such that the outer portion 146b of the opening 146 is located outside the piston contact part 121. Thus, it is possible to secure a uniform surface pressure pattern through the movement of the center of the surface pressure.

The inner diameter of the opening 146 may be larger than the inner diameter of the piston contact part 121 and smaller than the outer diameter of the piston contact part 121. Thus, the inner portion 146a of the opening 146 may be located between the inner and outer surfaces of the piston contact part 121.

When the inner portion 146a of the opening 146 is located inside the inner surface of the piston member 120, the piston contact part 121 is located between the inner portion 146a and the outer portion 146b of the opening 146. In this case, the torsional behavior of the piston member 120 may occur to increase the required amount of fluid for braking in the piston member 120.

Thus, in the present embodiment, the inner diameter of the opening 146 may be located between the inner and outer surfaces of the piston member 120, in order to facilitate the torsional behavior of the piston member 120.

Hereafter, for convenience of description, the center of the surface pressure between the brake pad 130 and the disk by the piston member 120 when the opening 146 is not formed in the pad shim 145 will be referred to as a first surface pressure center A (see FIG. 6), and the center of the surface pressure between the disk and the brake pad 130 moved through the opening 146 will be referred to as a second surface pressure center A' (see FIG. 7). Furthermore, the distance between the first surface pressure center A and the second surface pressure center A' will be referred to as a center movement distance c.

At this time, the center movement distance c, i.e. the displacement of the surface pressure center, may be decided in consideration of the coefficient of friction between the brake pad 130 and the disk.

The coefficient of friction between the brake pad 130 and the disk may be different depending on a braking condition. The larger the coefficient of friction, the larger the center movement distance c. Therefore, the range of the center movement distance c in accordance with the present embodiment needs to be set in consideration of a change in the coefficient of friction between the brake pad 130 and the disk. The inner diameter of the opening 146 may be decided according to the center movement distance c.

According to the inner diameter of the opening 146, the shape and size of the opening 146 may be decided, and the inner diameter of the opening 146 may be calculated on the basis of the center movement distance c. More specifically, the center of the pressure may be moved in order to uniformize the surface pressure between the brake pad 130 and the disk, and the position of the inner diameter of the opening 146 may be changed according to the displacement of the center of pressure required at this time. That is, the relative position between the opening 146 and the piston contact part 121 may be decided.

Hereafter, referring to FIGS. 5 to 7, a process of calculating the optimal center movement distance c in consideration of a braking condition and the coefficient of friction between the brake pad 130 and the disk and a process of calculating the inner diameter of the opening 146 through the center movement distance c will be described in detail. However, the method of calculating the center movement distance c and the method of calculating the inner diameter of the opening 146 are not limited to the following embodiment, and various methods may be applied without departing from the technical scope of the present disclosure.

FIG. 5 is a front view illustrating that the brake pad 130 and the shim plate 140 are coupled in the disk brake apparatus in accordance with the embodiment of the present disclosure, when seen from the pad shim 145, FIG. 6 as a comparative example is a diagram for describing a pressure gradient between the brake pad 130 and the shim plate 140 when the opening 146 is not formed in the pad shim 145, and FIG. 7 is a diagram for describing a pressure gradient between the brake pad 130 and the shim plate 140 when the opening 146 is formed in the pad shim 145.

In FIG. 5, $D_{piston(out)}$ represents the outer diameter of the piston contact part 121, $D_{piston(in)}$ represents the inner diameter of the piston contact part 121, $D_{shim\ open(out)}$ represents the outer diameter of the opening 146, and $D_{shim\ open(in)}$ represents the inner diameter of the opening 146.

As described above, the outer diameter of the opening 146 may be larger than the outer diameter of the piston contact part 121 ($D_{shim\ open(out)} > D_{piston(out)}$), and the inner diameter of the opening 146 may be larger than the inner diameter of the piston contact part 121 and smaller than the outer diameter of the piston contact part 121 ($D_{piston(in)} < D_{shim\ open(in)} < D_{piston(out)}$). Thus, the inner portion 146a of the opening 146 may be located on the region at least partially overlapping the piston contact part 121.

Referring to FIG. 6 as a comparative example, when the opening 146 is not formed in the pad shim 145, a non-uniform pressure gradient may be formed in the brake pad 130 in case that hydraulic pressure is applied to the piston member 120.

In FIG. 6, an equation of rotational moment is expressed as Equation 1 below. In the following equation, μf represents the coefficient of friction between the brake pad 130 and a pad support, μp represents the coefficient of friction between the brake pad 130 and the disk (rotor), $l_p$ represents the length of a sliding portion of the brake pad, and $t_p$ represents the thickness of the brake pad 130. The variables may be changed according to a braking condition. $F_f$ represents a friction force between the disk and the brake pad 130, and $F_d$ represents a friction force applied to the pad support. F represents a difference in friction force between the center of the brake pad 130 and the leading side 130a (or the trailing side 130b).

According to Equation 1, F and $F_{max}$ are arranged as follows.

$$\Sigma M_A = -\frac{1}{2}l_p F_f - t_p F_d + \frac{1}{6}l_p \Delta F = 0 \quad \text{[Equation 1]}$$

$$= -\frac{1}{2}l_p F_{av}\mu_p\mu_f - t_p F_{av}\mu_p + \frac{1}{6}l_p \Delta F = 0$$

$$\therefore \Delta F = \frac{6F_{av}}{l_p}\left(\mu_p t_p + \frac{1}{2}\mu_p\mu_f\right)$$

$$\therefore F_{max} = F_{av} + \Delta F = F_{av}\left[1 + \frac{1}{6}\left(\mu_p t_p + \frac{1}{2}\mu_p\mu_f\right)\right]$$

Usually $F_{max} = 1.33 F_{av}$.

FIG. 6 and Equation 1 show that, when the opening 146 is not formed in the pad shim 145, a non-uniform pressure gradient is formed in case that hydraulic pressure is applied to the piston. That is, the pressure of the leading side of the brake pad 130, corresponding to the rotation entrance of the disk, becomes larger than the friction force of the trailing side of the brake pad 130, corresponding to the rotation exit of the disk. In this case, an uneven wear pattern is formed between the disk and the brake pad 130. Thus, the exciting force may be increased to cause squeal noise.

Referring to FIG. 7, when the opening 146 is formed in the pad shim 145, a uniform pressure gradient may be formed across the brake pad 130 in case that hydraulic pressure is applied to the piston. That is, as the opening 146 is formed in the pad shim 145, the center of the surface pressure may be moved to the second surface pressure center A'. Thus, uniform surface pressure may be applied to the brake pad 130. In this case, an equation of rotational moment may be arranged as Equation 2 below. In Equation 2, c represents the center movement distance between the first surface pressure center A and the second surface pressure center A'. That is, c may represent the displacement of the surface pressure center.

According to Equation 2, the center movement distance c of the surface pressure may be arranged as follows.

$$\Sigma M_A = -\left(\frac{1}{2}l_p - c\right)F_f - t_p F_d + cF_{avr} = 0 \quad \text{[Equation 2]}$$

$$= -\left(\frac{1}{2}l_p - c\right)F_{av}\mu_p\mu_f - t_p F_{av}\mu_p + cF_{av} = 0$$

$$\therefore c = \frac{\mu_p t_p + \frac{1}{2}l_p\mu_p\mu_f}{1 + \mu_p\mu_f}$$

Therefore, the optimal center movement distance c may be calculated through variables based on a braking condition. At this time, the coefficient of friction between the disk and the brake pad 130 may be changed according to the braking condition, and the optimal center movement distance c may increase as the coefficient of friction is increased.

Referring to FIGS. 5 and 7, the relationship between the center movement distance c and the shape and size of the opening 146 may be arranged as in Equation 3 below. In Equation 3, α represents the angle between the top of the opening 146 and a reference line extended in parallel to the ground surface from the center of the piston contact part 121, and β represents the angle between the bottom of the opening 146 and the reference line extended in parallel to the ground surface from the center of the piston contact part 121.

$$P = \frac{\frac{D_{piston(out)} + D_{shim\ open(in)}}{4}(\sin\alpha + \sin\beta)}{2\pi - \alpha - \beta} \quad \text{[Equation 3]}$$

$$Q = \frac{360 - \alpha - \beta}{360} \cdot \left[\pi \cdot \left(\frac{D_{piston(out)}}{2}\right)^2 - \pi \cdot \left(\frac{D_{shim\ open(in)}}{2}\right)^2\right]$$

$$R = \left[\pi \cdot \left(\frac{D_{shim\ open(in)}}{2}\right)^2 - \pi \cdot \left(\frac{D_{piston(in)}}{2}\right)^2\right]$$

$$\therefore C = P \cdot \frac{Q}{Q + R}$$

The center movement distance c may be calculated through Equation 2 above, and the inner diameter of the opening 146 may be calculated through a quadratic equation of the inner diameter $D_{shim\ open(in)}$ of the opening 146 in Equation 3. As described above, the inner diameter of the opening 146 may be decided according to the center movement distance c, and the optimal center movement distance c may be calculated to obtain the optimal inner diameter of the opening 146.

For example, when the minimum value $\mu_{p(min)}$ of the coefficient of friction between the brake pad 130 and the disk is 0.26, the maximum value $\mu_{p(max)}$ of the coefficient of friction between the brake pad 130 and the disk is 0.38, $\mu_f$ is 0.1, $_p$ is 135 mm, and $t_p$ is 11 mm, the maximum value $c_{max}$ of the center movement distance c may be calculated as 6.5 mm, and the minimum value $c_{min}$ of the center movement distance c may be calculated as 4.5 mm, according to Equation 2.

Furthermore, when the center movement distance c and the values, calculated through Equation 2, are inputted to Equation 3 while α is 45°, β is 45°, the inner diameter $D_{piston(in)}$ of the piston contact part 121 is 33.5 mm, and the outer diameter $D_{piston(out)}$ of the piston contact part 121 is 56.8 mm, the maximum value $D_{shim\ open(in,max)}$ of the inner diameter of the opening 146 may be calculated as 42.64 mm, and the minimum value $D_{shim\ open(in,min)}$ of the inner diameter of the opening 146 may be calculated as 34.77 mm.

When the inner diameter of the opening 146 is decided on the basis of the calculated values, the inner diameter of the opening 146 may be set to a value which is smaller than the maximum value $D_{shim\ open(in,max)}$ of the inner diameter of the opening 146 and larger than the minimum value $D_{shim\ open(in,min)}$ of the inner diameter of the opening 146, in case that the minimum value $D_{shim\ open(in,min)}$ of the inner diameter of the opening 146 is larger than the inner diameter $D_{piston(in)}$ of the piston contact part 121 ($D_{shim\ open(in,min)} > D_{piston(in)}$).

On the other hand, when the minimum value $D_{shim\ open(in,min)}$ of the inner diameter of the opening 146 is smaller than the inner diameter $D_{piston(in)}$ of the piston contact part 121 ($D_{shim\ open(in,min)} < D_{piston(in)}$), the inner diameter of the opening 146 may be set to a value which is smaller than the maximum value $D_{shim\ open(in,max)}$ of the inner diameter of the opening, and larger than the inner diameter $D_{piston(in)}$ of the piston contact part 121.

However, the disk brake apparatus 100 in accordance with the embodiment of the present disclosure is not limited to the above-described values, but the center movement distance c and the inner diameter of the opening 146 based on the center movement distance c may be changed by a variable depending on a braking condition.

In the shim plate in accordance with the embodiment of the present disclosure, the opening may be formed in the pad shim, not the cover shim which comes into contact with the piston member, which makes it possible to minimize the increase in required amount of fluid in the piston member, while uniformizing the surface pressure between the brake pad and the disk.

In accordance with the embodiment of the present disclosure, it is possible to improve the performance of the vehicle while minimizing the generation of noise during braking.

Furthermore, the center movement distance may be decided in consideration of a change in coefficient of friction between the brake pad and the disk, and the inner diameter of the opening may be decided through the center movement distance, which makes it possible to decide the inner diameter of the opening to uniformize the surface pressure distribution.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A disk brake apparatus comprising:
   a caliper body positioned on an outer circumference of a disk;
   a piston member positioned in the caliper body and configured to move when a hydraulic pressure is applied to the piston member;
   a brake pad pressed toward the disk by the piston member; and
   a shim plate having a plate shape, positioned between the piston member and the brake pad, and abutting on a piston contact part positioned on a surface of the piston member and facing the brake pad,
   wherein the shim plate comprises:
      a cover shim in contact with the piston contact part; and
      a pad shim stacked on a surface of the cover shim, facing the brake pad, and having a region at least partially overlapping the piston contact part and having an opening, and
   wherein:
   the piston contact part is a ring-shaped piston contact part,
   the opening has an arc-shape around a center of the ring-shaped piston contact part,
   an inner diameter of the opening is greater than an inner diameter of the ring-shaped piston contact part and less than an outer diameter of the ring-shaped piston contact part,
   an outer diameter of the opening is greater than the outer diameter of the ring-shaped piston contact part so that the opening extends over the outer diameter of the ring-shaped piston contact part and so that no opening portion is provided in the pad shim within an area of the pad shim overlapping an area of the piston member which is within the inner diameter of the ring-shaped piston contact part, and
   the cover shim is located between the opening in the pad shim and the ring-shaped piston contact part so that the opening in the pad shim is separated from the ring-shaped piston contact part by the cover shim.

2. The disk brake apparatus of claim 1, wherein the cover shim is larger than the ring-shaped piston contact part.

3. The disk brake apparatus of claim 1, wherein the cover shim is constructed to have no opening.

4. The disk brake apparatus of claim 1, wherein:
   the brake has a leading side at which a rotation entrance of the brake pad in a rotation direction of the disk is positioned, and a trailing side at which a rotation exit of the brake pad in the rotation direction of the disk is positioned, and
   the opening is located at the leading side of the brake around a center of the pad shim.

5. The disk brake apparatus of claim 4, wherein an optimal center movement distance between (i) a first surface pressure center of a first surface pressure between the disk and the brake pad by the piston member when the opening is not formed in the pad shim, and (ii) a second surface pressure center of a second surface pressure between the disk and the brake pad moved by the opening is determined based on a coefficient of friction between the brake pad and the disk, and wherein an optimum value for the inner diameter of the opening is determined based on the determined optimal center movement distance.

6. The disk brake apparatus of claim 5, wherein the optimal center movement distance is based on a length of a sliding portion of the brake pad and a thickness of the brake pad.

7. The disk brake apparatus of claim 6, wherein the optimal center movement distance "c" is determined based on equations:

$$\Sigma M_A = -\frac{1}{2}l_p F_j - t_p F_d + \frac{1}{6}l_p \Delta F = 0$$

$$= -\frac{1}{2}l_p F_{av}\mu_p\mu_f - t_p F_{av}\mu_p + \frac{1}{6}l_p \Delta F = 0$$

$$\therefore \Delta F = \frac{6F_{av}}{l_p}\left(\mu_p t_p + \frac{1}{2}\mu_p\mu_f\right)$$

$$\therefore F_{max} = F_{av} + \Delta F = F_{av}\left[1 + \frac{1}{6}\left(\mu_p t_p + \frac{1}{2}\mu_p\mu_f\right)\right]$$

and $$\Sigma M_A = -\left(\frac{1}{2}l_p - c\right)F_f - t_p F_d + cF_{avr} = 0$$

-continued $$= -\left(\frac{1}{2}l_p - c\right)F_{av}\mu_p\mu_f - t_p F_{av}\mu_p + cF_{av} = 0$$

$$\therefore c = \frac{\mu_p t_p + \frac{1}{2}l_p\mu_p\mu_f}{1 + \mu_p\mu_f}$$

Where: F represents a difference in friction force between a center of the brake pad and the leading side of the brake pad, $F_{av}$ represents an average friction force, $F_{max}$ represents a maximum friction force, $\mu_f$ represents a coefficient of friction between the brake pad and a pad support, $\mu_p$ represents a coefficient of friction between the brake pad and the disk, $I_p$ represents the length of a sliding portion of the brake pad, $t_p$ represents the thickness of the brake pad, $F_f$ represents a friction force between the disk and the brake pad, and $F_d$ represents a friction force applied to the pad support.

* * * * *